July 1, 1969     B. M. TORREY     3,453,419
CODE READING SYSTEM
Filed Dec. 23, 1965     Sheet 1 of 6
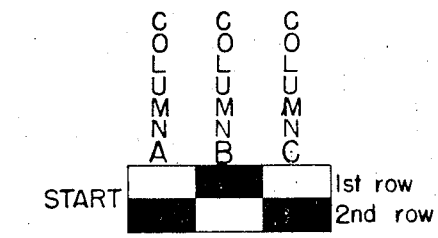
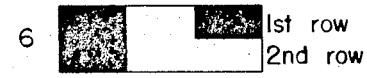
FIG. 1
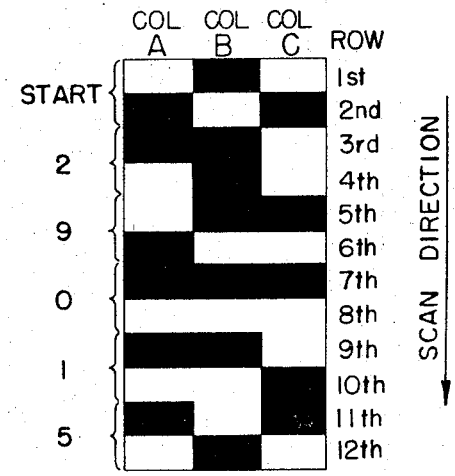
FIG. 2
FIG. 8
FIG. 9
INVENTOR.
BRADFORD M. TORREY
BY Weingarten,
Ourbuch &
Lahive
ATTORNEYS

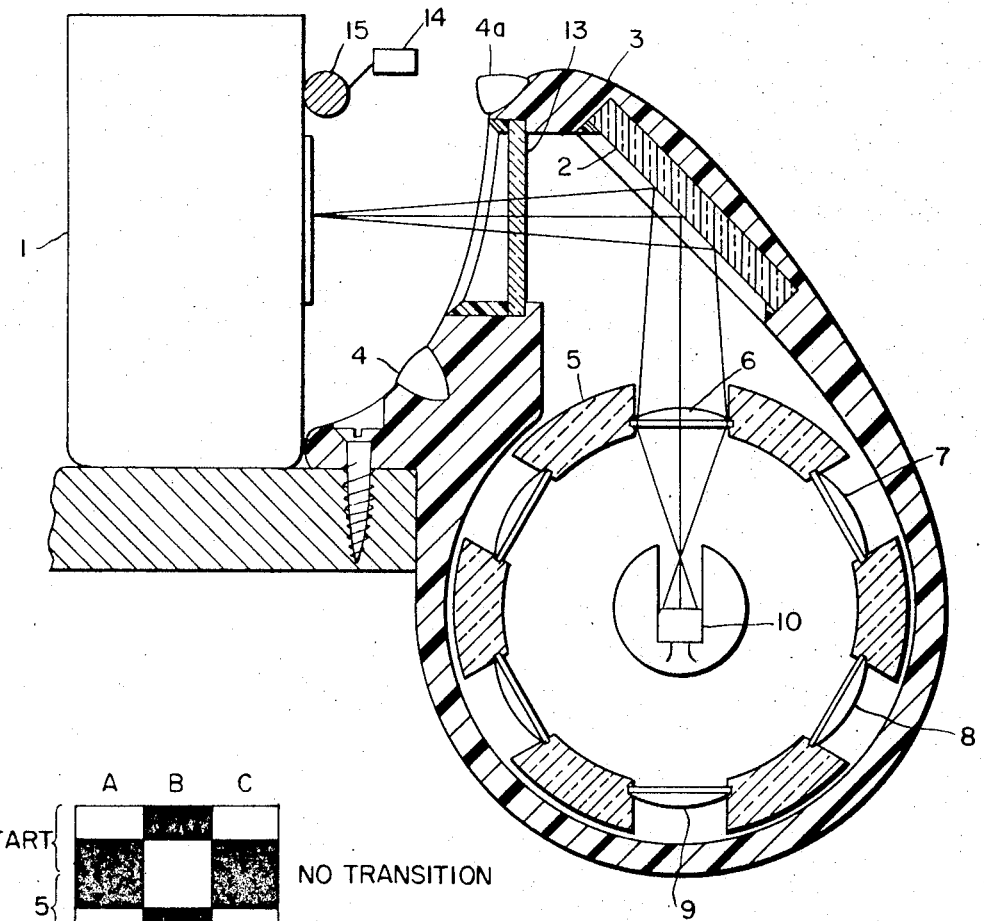
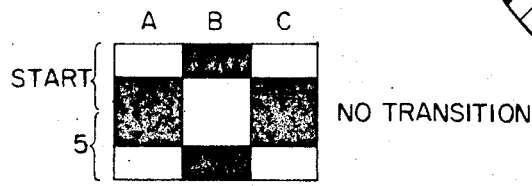
FIG. 10
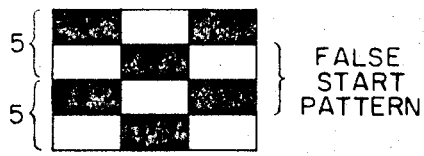
FIG. 11
FIG. 3
INVENTOR.
BRADFORD M. TORREY
BY Weingarten,
Orenbuch &
Lahive
ATTORNEYS July 1, 1969   B. M. TORREY   3,453,419
CODE READING SYSTEM
Filed Dec. 23, 1965   Sheet 3 of 6

INVENTOR.
BRADFORD M. TORREY
BY Weingarten,
Ovenbuch &
Lahive
ATTORNEYS

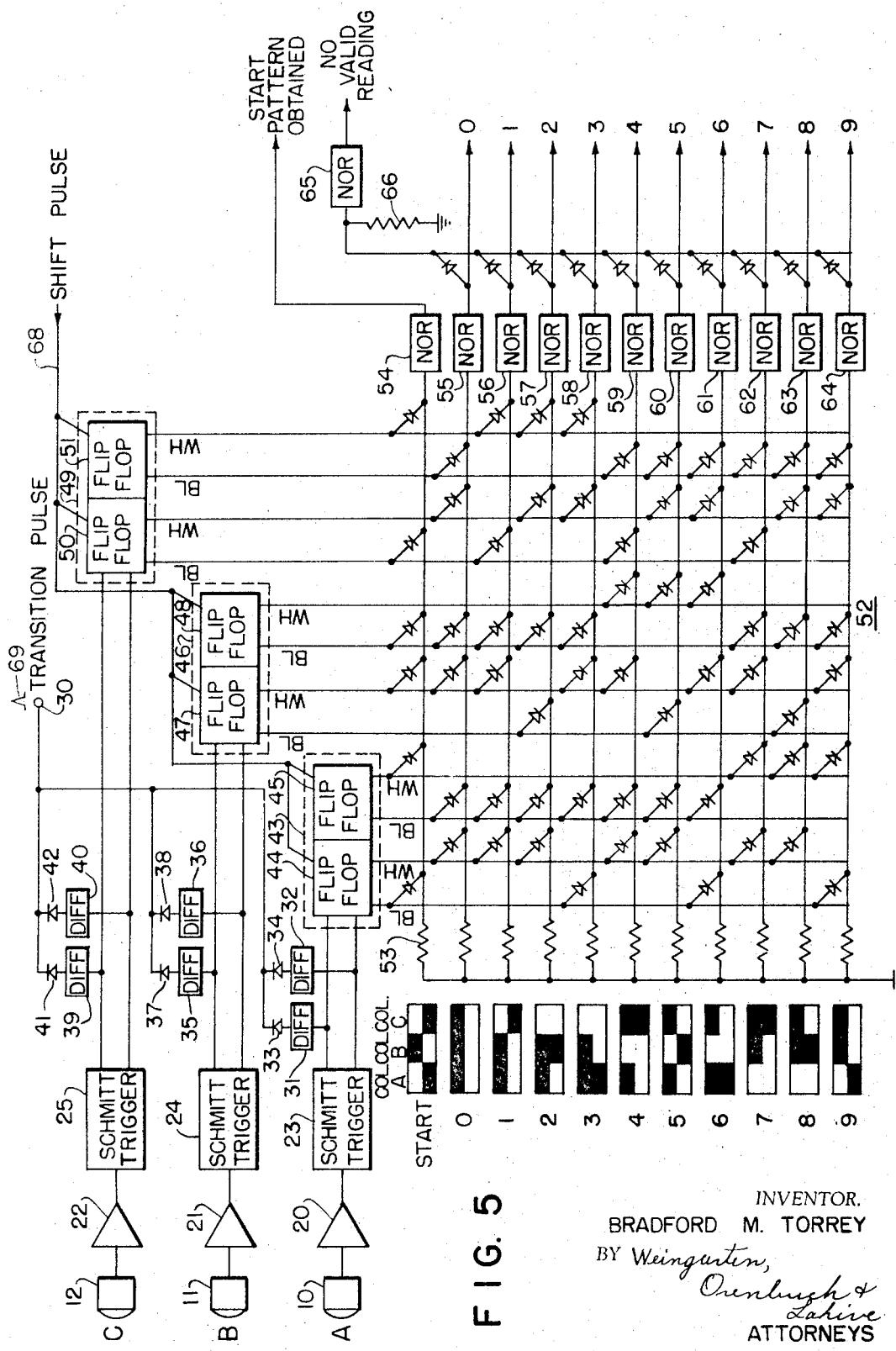

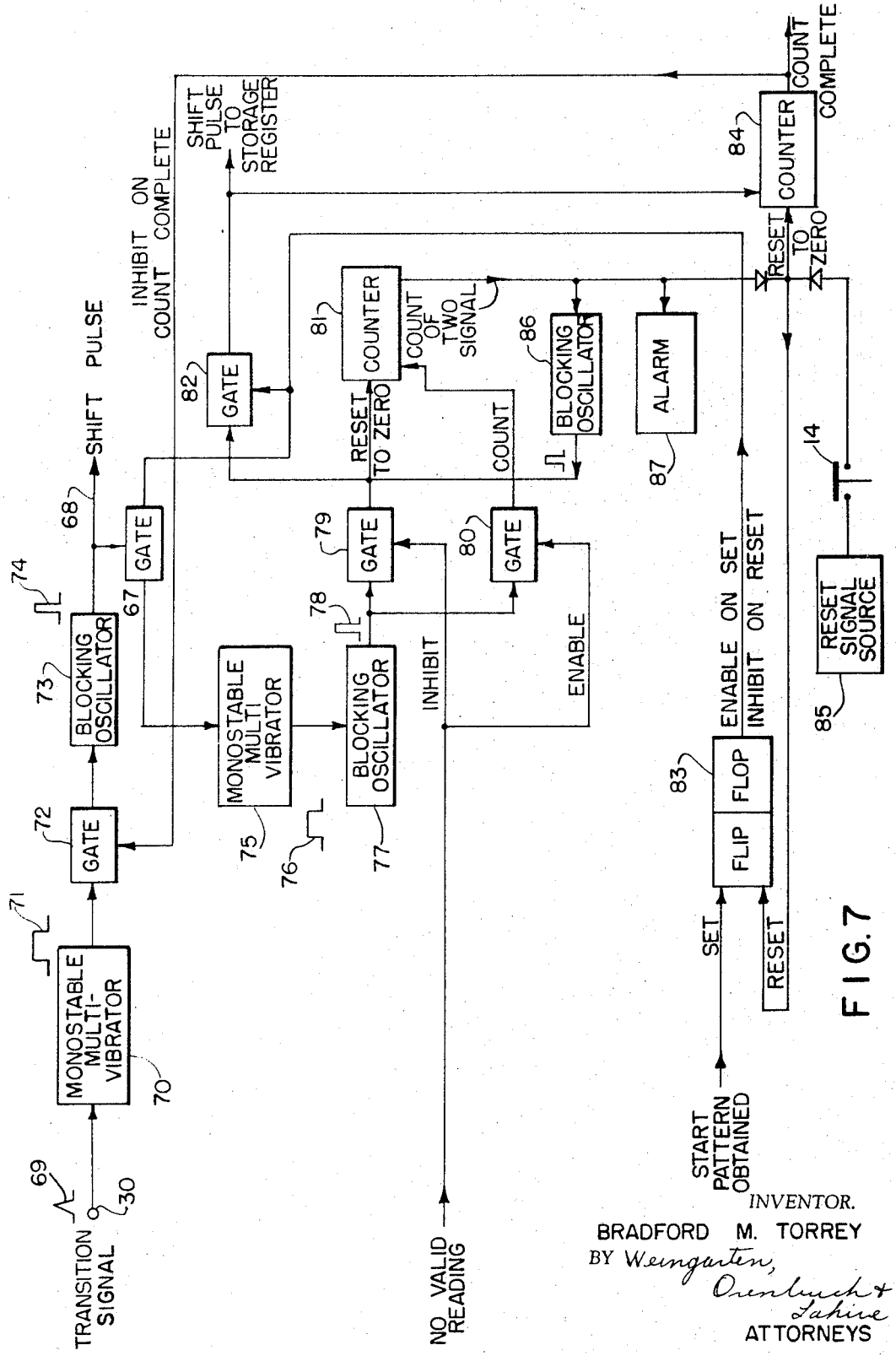

FIG. 12 m = NUMBER OF ELEMENTS IN CODE GROUP n = NUMBER OF BINARY ONES IN CODE GROUP

| n \ m | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 |
| 1 | 1 | 2 | 3 | 4 | 5 | 6 | 7 | 8 | 9 | 10 | 11 | 12 | 13 | 14 |
| 2 | — | 1 | 3 | 6 | 10 | 15 | 21 | 28 | 36 | 45 | 55 | 66 | 78 | 91 |
| 3 | — | — | 1 | 4 | 10 | 20 | 35 | 56 | 84 | 120 | 165 | 220 | 286 | 364 |
| 4 | — | — | — | 1 | 5 | 15 | 35 | 70 | 126 | 210 | 330 | 495 | 715 | 1001 |
| 5 | — | — | — | — | 1 | 6 | 21 | 56 | 126 | 252 | 462 | 792 | 1287 | 2002 |
| 6 | — | — | — | — | — | 1 | 7 | 28 | 84 | 210 | 462 | 924 | 1716 | 3003 |
| 7 | — | — | — | — | — | — | 1 | 8 | 36 | 120 | 330 | 792 | 1716 | 3432 |
| 8 | — | — | — | — | — | — | — | 1 | 9 | 45 | 165 | 495 | 1287 | 3003 |
| 9 | — | — | — | — | — | — | — | — | 1 | 10 | 55 | 220 | 715 | 2002 |
| 10 | — | — | — | — | — | — | — | — | — | 1 | 11 | 66 | 286 | 1001 |
| 11 | — | — | — | — | — | — | — | — | — | — | 1 | 12 | 78 | 364 |
| 12 | — | — | — | — | — | — | — | — | — | — | — | 1 | 13 | 91 |
| 13 | — | — | — | — | — | — | — | — | — | — | — | — | 1 | 14 |
| 14 | — | — | — | — | — | — | — | — | — | — | — | — | — | 1 |
| TOTALS | 2 | 4 | 8 | 16 | 32 | 64 | 128 | 256 | 512 | 1024 | 2048 | 4096 | 8192 | 16384 |

INVENTOR.
BRADFORD M. TORREY

United States Patent Office 3,453,419
Patented July 1, 1969

3,453,419
CODE READING SYSTEM
Bradford M. Torrey, Carlisle, Mass., assignor to Charecogn Systems, Inc., Allston, Mass., a corporation of Massachusetts
Filed Dec. 23, 1965, Ser. No. 515,889
Int. Cl. G06k 7/10; H03k 13/02
U.S. Cl. 235—61.11                              4 Claims

ABSTRACT OF THE DISCLOSURE

A system for reading information coded in the form of binary valued elemental areas arranged in rows and columns. Each unit of information resides in a two row pattern of areas which exhibits a change in binary value between the two rows in at least one column. Every acceptable pattern has the same number of areas and the same ratio of binary ONE areas to binary ZERO areas. A scanner scans the columns and reads all the areas in a row simultaneously to sense the binary values of those areas. The binary values are stored in a shift register. Stored information relating to a row is shifted in the register in response to a signal indicating when the scan has passed to another row. The system recognizes acceptable code patterns and indicates an invalid reading when two unacceptable code patterns are entered in succession in the register.

---

This invention relates in general to data processing systems and more particularly concerns an improved data reading system employing a self-clocking code.

In many uses of data reading systems, the system is required to provide protection against erroneous readings. In some situations it is preferred to have no reading rather than an erroneous reading. Where, for example, the data reading system is employed to read the price of merchandise, it is preferable to have the system reject an inaccurate reading rather than enter an erroneous price. In situations where there are opportunities to tamper with the code, it is desirable to employ a code that is difficult to alter in a manner acceptable to the data reading system.

The principal objective of this invention is to provide a data reading system that insures accurate readings. An additional objective of the invention is to employ a code which cannot easily be altered, either deliberately or inadvertently, in a manner which permits the altered code to be accepted as valid by the data reading apparatus.

The invention utilizes a scheme for encoding information as patterns of binary valued elemental areas arranged in rows and columns, each elemental area having a binary value of ONE or ZERO. In the preferred embodiment of the invention, each elemental area is a rectangular bar and the binary value of the bar is conveyed by its color, which is either black or white, depending upon whether its value is ONE or ZERO. Each pattern of bars corresponds to a unit of information which has some value in another system. For example, the unit of information may be a decimal numeral or a letter of the alphabet. Each pattern, in the preferred embodiment, consists of two rows of rectangular bars, each row having three bars which are in different columns. Each pattern exhibits a change in binary value from one row to its other in at least one column. A scanner is employed to simultaneously scan all the columns in a manner causing the coded patterns to be read row by row. When the scan of the scanner passes from one row to the next row, a transition signal is obtained which is employed to shift information from the scanner into a register. The information placed in the registers is the binary values of the bars constituting a pattern. That is, as the scanner looks at a row of the pattern, the transition signal results in a shift pulse which causes the binary values of the bars in the row to be entered into the registers. When two rows have been scanned, the binary values entered in the registers identify a code pattern which may or may not be a valid pattern. In the invention, there is provided apparatus for recognizing when the binary values of a valid code pattern are entered in the registers. That apparatus is arranged to emit a signal indicative of the unit of information corresponding to the recognized valid pattern. Where the values of an invalid pattern are entered in the registers, the invention causes a "no valid reading" signal to be generated. In the normal arrangement of the coded patterns, an invalid pattern is succeeded by a valid pattern. Where two invalid patterns occur in succession, either an erroneous reading has been made or the code pattern has been altered in a manner making it unacceptable to the code reading apparatus. The successive occurrence of two "no valid reading" signal causes the apparatus to signal that an erroneous reading has been obtained and prevents further reading of the code patterns. The data reading apparatus must then be reset to condition it for further use. Where each "no valid reading" signal is succeeded by a valid pattern, the reading apparatus continues to read the code patterns. After a predetermined number of valid code patterns are obtained, a counter emits a "count complete" signal which prevents further transfer of information into the registers. The "count complete" signal, in effect, signifies that all the coded information has been correctly read and inhibits further operation of the data reading apparatus. The apparatus is thereby prevented from rereading the same coded information. Thereafter, the apparatus must be reset to place it in condition to again read code patterns.

The arrangement, construction, and manner of operation of the invention are detailed in the following exposition and an understanding of the invention can be obtained from a consideration of the exposition when employed in conjunction with the accompanying drawing in which:

FIG. 1 illustrates a preferred form of the bar code employed in the invention;

FIG. 2 depicts the preferred manner of assembly the bar code;

FIG. 3 is a view showing the internal arrangement of a scanner that may be employed in the invention;

FIG. 5 shows the scheme of apparatus for converting the bar code to decimal signals;

FIG. 7 is a block diagram showing the arrangement of apparatus for determining whether the bar code has been accurately read;

Figure 4:
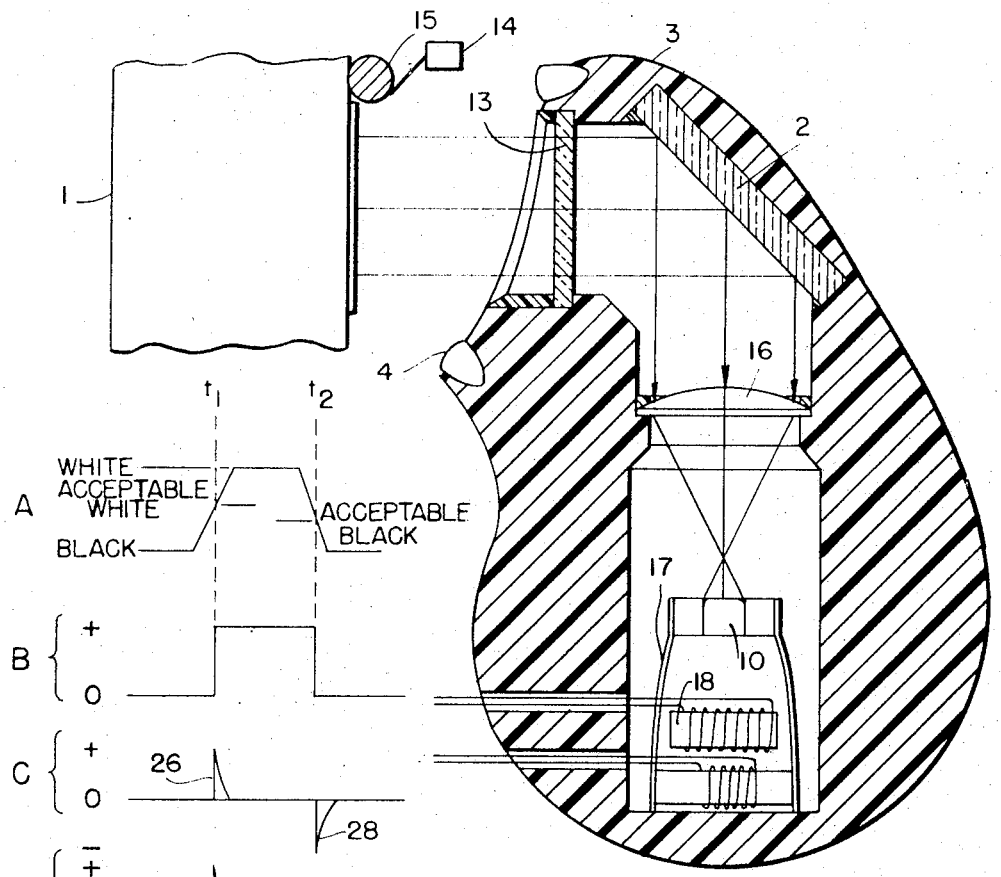
FIG. 4 depicts an alternative construction of the scanner.

FIGS. 8, 9, 10, and 11 show patterns that may occur in the bar code; and

FIG. 12 is a table showing the maximum number of different patterns obtainable from a code utilizing $m$ number of elemental areas and having $n$ number of binary ONE areas.

Referring now to FIG. 1, a bar code of the type employed in the invention is depicted. The code consists of two kinds of rectangular blocks or bars arranged in rows and columns. Where the information conveyed by the code is a number in the decimal system, the bar code has ten different arrangements of the rectangular blocks, each arrangement corresponding to a different one of the ten decimal symbols 0, 1, 2, 3 . . . 9. In addition, the bar code has an arrangement of rectangular blocks that is placed at the head of the columns to indicate the beginning of the code.

In FIG. 1, each rectangular block is shown to be either black or white for expository purposes. It is necessary that the blocks be of two kinds which can readily be distinguished by the scanner that reads the code. The blocks may be of two different colors, for example, red and blue, or one type of block may fluoresce when exposed to ultra violet radiation while the other type of block does not fluoresce. Each code arrangement consists of six blocks disposed in two rows of three blocks each. In order to make it difficult to tamper with the bar code, each arrangement of six blocks employs three white blocks and three black blocks. Only a pattern formed by three white blocks and three black is accepted by the code reading apparatus described hereinafter. To tamper with the bar code, it is necessary not only to convert a white block to black but also to convert a black block to white to counterfeit the requisite balance inherent in each six block arrangement. Further, it is an essential characteristic of the bar code employing the two row arrangement that in moving from the first row to the second row there is always a transition from a block of one type to a block of the other type in at least one of the columns. For example, in the pattern for the decimal symbol 6, the blocks under column A are both black, the blocks under column B are both white, but the blocks in column C change from black in the first row to white in the second row. Because a transition always exists when scanning from the first row to the second row, the bar code is a self-clocking code.

The bar code for any number in the decimal system is assembled in the minimum space by placing the start pattern at the beginning and stacking in sequence the code patterns for each decimal digit in the number so that the patterns abut one another. For example, the bar code for the decimal number 29015 is assembled, as indicated in FIG. 2, by placing the start pattern at the top and thereunder placing the code pattern for the decimal symbol 2, followed by the code pattern for decimal symbol 9 under which are placed in sequence the code patterns for decimal symbols 0, 1 and 5.

A scanning mechanism for rapidly reading the bar code is illustrated in FIG. 3. The bar code, for example, is printed upon a package 1 and the package is positioned so that the image of the bar code appears in the mirror 2 which is set at an angle in housing 3. Lamps 4 and 4a on the housing are disposed to illuminate the bar code printed on the package. The white areas in the code reflect the light whereas the black areas tend to absorb the light. Within the housing is mounted a turret 5 having lenses 6, 7, 8 and 9 spaced around the turret's periphery. Inside the turret are disposed three photocells 10, 11 and 12. Only photocell 10 is visible in FIG. 3 because the other two photocells are located behind and in alignment with the visible photocell. The three photocells are stationary whereas the turret is constantly rotating. Each lens as it is carried around, causes the image in the mirror to be focused upon the photocells so that each horizontal row simultaneously is projected upon the three photocells. Because the lens is in motion, the horizontal rows in the bar are sequentially scanned by the three photocells as the image of each row is, in turn, projected by the lens upon the photocell. By causing the turret to rotate at a high speed, the bar code is scanned very rapidly. To prevent dust and dirt from entering the housing and interfering with the operation of the scanning mechanism, the housing is closed off by a window 13. In order to prevent the system from reading the bar code more than once for each item, a normally closed switch 14 is actuated to cause a single a single reading to be made. For example, pressing the package against rail 15 causes the pressure sensitive switch 14 to open which thereupon permits the code reading apparatus to read the bar code. In order to obtain a second reading, switch 14 must be permitted to close and then must be opened again.

A modified scanning mechanism is depicted in FIG. 4 which utilizes a stationary lens 16 to focus the image of the bar code upon the three photocells, 10, 11 and 12. The three photocells are carrying upon a vibrating frame 17 so that they are carried from side to side by the reciprocating frame. As the photocells move, the image of each horizontal row is projected upon the three photocells simultaneously. The reciprocating frame is kept in motion by suitable driving means 18.

The bar code ought to be so aligned relative to the scanner that each of the three columns is scanned by a different photocell. That is, where the bar code of FIG. 2 is employed, column A should be scanned only by photocell 10, column B should be scanned only by photocell 11, and column C should be scanned only by photocell 12. Further, each row must be simultaneously scanned by the three photocells. Where the bar code is misaligned to the extent that three photocells cannot completely scan their respective columns, the reading apparatus is arranged to reject the faulty scan.

To increase the strength of the electrical signals obtained from the photocells 10, 11 and 12, the output of each photocell, as schematically illustrated in FIG. 5, is impressed upon an amplifier 20, 21, or 22. Where the bar scanned by the photocell is white, the light received by the photocell causes a relatively large output signal whereas when the bar is black, the output of the photocell is quite small. In use, however, the bar code pattern may become dirty or may become smudged, so that the reflectivity of the white areas may be substantially impaired. It is also possible, although not so likely, that the light absorption characteristic of the black bars may be reduced and those bars may become somewhat light reflective. In these latter situations, the code reader must accept a signal as either a black bar signal or a white bar signal; in-between values have no meaning in the bar code as there are only two kinds of bars, viz. black and white. A Schmitt trigger is employed to determine whether an in-between signal shall be deemed to be a black bar signal or a white bar signal. In channels A, B, and C, therefore, photocells 10, 11, and 12, are coupled through their respective amplifiers 20, 21, and 22 to Schmitt trigger circuits 23, 24, and 25.

A Schmitt trigger is a variety of bistable multivibrator. The Schmitt trigger can be made to change from one stable state to its other stable state by applying a voltage exceeding a preset value to the Schmitt trigger input. The Schmitt trigger will remain in that state until the input signal falls below another preset value. A Schmitt trigger is, therefore, a device that exhibits hysteresis because it changes from one state to its other when the input signal is at one level and changes back to its original state when the input signal reaches a different level.

Figure 6:
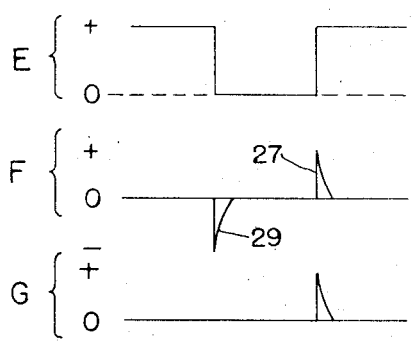
FIG. 6 is a waveform diagram illustrating the operation of a Schmitt trigger.

Assuming that the amplified output of photocell 10 is the waveform shown in FIG. 6(A), resulting from a black bar changing to a white bar and then back to a black bar during the scan, the Schmitt trigger changes at time $t_1$ from its initial stable state to its other stable state when the amplified photocell output signal reaches the "acceptable white" level and the Schmitt trigger remains in that state until the amplified photocell output signal drops down to the "acceptable black" level at time $t_2$. The Schmitt trigger, being a multivibrator, is able to provide two outputs as indicated in FIGS. 6(B) and 6(E), one output being the inverse of the other. For example, where the waveform of FIG. 6(B) rises from the 0 voltage level to the +6 voltage level at time $t_1$, the output waveform of FIG. 6(E) concurrently drops from the +6 voltage level to the 0 voltage level.

The Schmitt trigger converts the output signal of the photocell to a rectangular waveform. By differentiating the output of the Schmitt trigger, a positive voltage spike is obtained where the output rises steeply and a negative voltage spike is obtained where the output falls abruptly. For example, by differentiating the waveform of FIG. 6(B), the voltage spikes shown in FIG. 6(C) are obtained and by differentiating the waveform of FIG. 6(E), the voltage spikes of FIG. 6(F) are obtained. The voltage spikes of FIGS. 6(C) and 6(F) indicate the transition from one type of bar to the other type of bar in the code; that is, the voltage spikes mark the transition from a white bar to a black bar and the transition from a black bar to a white bar. The positive spike 26 in FIG. 6(C) marks the transition from a black bar to a white bar, whereas the positive spike 27 in FIG. 6(F) marks the transition from a white bar to a black bar. As the negative spikes 28 and 29 in FIGS. 6(C) and 6(F) are not needed, they are removed, as in FIGS. 6(D) and 6(E), by using diodes to prevent the transmission of the negative spikes.

In FIG. 5, the outputs of Schmitt trigger 23 in channel A are connected to transition pulse terminal 30 by differentiators 31, 32 and diodes 33 and 34 so that only positive voltage spikes appear at that terminal. In channel B, Schmitt trigger 24 is similarly coupled to terminal 30 by differentiators 35, 36 and diodes 37, 38; and in channel C, Schmitt trigger 25 is coupled in the same manner to terminal 30 by differentiators 39, 40 and diodes 41, 42. Any transition whether from a black bar to a white bar or from a white bar to a black bar, which occurs during the scan in columns A, B, or C, of the code, results in a transition pulse at terminal 30. For ease of exposition, it is assumed that photocell 10 of channel A scans column A of the bar code, that photocell 11 of channel B scans column B of the bar code, and that photocell 12 of channel C scans column C of the bar code.

The outputs of the Schmitt trigger in channel A are coupled to the inputs of a shift register 43 having two flip-flops 44 and 45 connected in the customary manner to cause the information stored in flip-flop 44 to be shifted into flip-flop 45 upon command of a shift pulse. As no third stage follows flip-flop 45, the information stored in that flip-flop is "lost" upon the occurrence of a shift pulse. In channel B, the outputs of Schmitt trigger 24 are coupled to a shift register 46 having two flip-flop stages 47 and 48; similarly, in channel C the outputs of Schmitt trigger 25 are coupled to shift register 49 in which are flip-flops 50 and 51. Each shift register provides four outputs, two outputs being obtained from the first stage flip-flop and the other two outputs being obtained from the second stage flip-flop. Each flip-flop is constructed to provide a positive voltage signal as one output and a zero voltage signal as the other output.

In FIG. 5, one output of each flip-flop is marked BL to indicate that that output is at zero voltage when a black bar signal is stored in the flip-flop; the other output of each flip-flop is marked WH to indicate that that output is at zero voltage when a white bar signal is stored in the flip-flop. Where the BL output of a flip-flop is at zero voltage, the WH output of that flip-flop must provide a positive voltage; when the WH output is at zero voltage, the BL output must provide a positive voltage. The four outputs from the shift register in each channel are connected to a diode matrix indicated generally at 52. As a matter of convention, each horizontal row in the matrix is depicted as terminated at one end by a resistor that is connected to ground and the other end of the horizontal row is depicted as connected to the input of a NOR gate. For example the topmost horizontal row in the diode matrix is connected to ground at one end by resistor 53 and the other end of the horizontal row is connected to the input of NOR gate 54. The topmost horizontal row has six diode connections which correspond to the six bars in the start code. When the start code pattern is scanned by photocells 10, 11, and 12, the flip-flops in shift registers 43, 46, and 49 are placed in states which cause all six outputs connected to the topmost horizontal row of the diode matrix to be placed at ground potential. NOR gate 54 is constructed to provide an output signal when its input is at ground potential and to provide no output signal when its input is at a positive voltage. Where all six shift register outputs connected to the topmost horizontal row of diode matrix 52 are at ground potential, NOR gate 54 provides an output signal signifying that a proper start pattern has been obtained. Where a pattern other than a start pattern is obtained, at least one of the six shift register outputs will be at a positive voltage and prevent NOR gate 54 from emitting an output signal. Because of the diode matrix, NOR gate 55 emits a signal when the code pattern corresponding to decimal symbol 0 is obtained, NOR gate 56 emits a signal when the code pattern corresponding to decimal symbol 1 is obtained, NOR gate 57 emits a signal when the code pattern corresponding to decimal symbol 2 is obtained, and so forth for NOR gates 58 to 64. Thus, so long as the patterns scanned by photocells 10, 11, and 12 correspond to the bar code patterns of FIG. 1, gates 55 to 64 will provide outputs indicating the decimal values of the patterns. Where the pattern scanned by the photocells does not correspond to one of the patterns of FIG. 1, all the NOR gates 54 through 64 fail to provide an output. Absence of an output from NOR gates 54 to 64, therefore, indicates that an invalid pattern has been obtained. The output of each NOR gate, 55 to 64, is coupled through a diode to the input of NOR gate 65. Where there is an absence of an output from NOR gates 55 to 64, a No Valid Reading signal is emitted by gate 65. Where there is an output from any one of NOR gates 55 to 64, a voltage develops across resistor 66 and gate 65 is thereby prevented from emitting a signal.

The bar code employed in the invention is inherently a self-clocking code because a transistion pulse always appears at terminal 30 in FIG. 5 whenever the scanner detects a change in the pattern of black and white bars. The transition pulse 69 at terminal 30, shown in FIG. 7, is impressed upon a monostable multivibrator 70 which thereupon emits a square wave 71 to gate 72. Assuming that gate 72 is enabled, the square wave signal is coupled through it to the input of a blocking oscillator 73 which is arranged to be triggered into operation by the trailing edge of wave 71. The output pulse 74 of the blocking oscillator, therefore, occurs sometime after the occurrence of transition signal 69. The delay in the generation of the blocking oscillator's output pulse permits the scan to move down about ⅓ of a row in the bar code. The output pulse 74, emitted by blocking oscillator 73 is transmitted along line 68 and is employed as the shift pulse for the shift registers 43, 46, and 49 in channels A, B, and C, as indicated in FIG. 5. Whenever information is shifted into the shift registers, the scan has passed beyond the transition point and is about ⅓ of the way down into a row of the bar code. Gate 67 initially is inhibited so that the pulse 74 from blocking oscillator 73 cannot pass through that gate. Information continues to be shifted into shift registers 43, 46, and 49 (FIG. 5) as a consequence of the shift pulses emanating from blocking oscillator 73, but as those pulses cannot pass through inhibited gate 67, those pulses have no other appreciable effect. When a start pattern is obtained, NOR gate 54 (FIG. 5) emits a signal which sets flip-flop 83 (FIG. 7). Upon being set, flip-flop 83 emits an enabling signal to gate 67 which causes that gate to pass the pulse signal 74 from blocking oscillator 73 to the input of monostable multivibrator 75. Flip-flop 83 is initially in the reset state and does not change states until it receives a "start pattern obtained" signal from NOR gate 54.

The output pulse of blocking oscillator 73, in addition to acting as a shift pulse, is used, when gate 67 is enabled, to trigger monostable multivibrator 75. Upon being triggered, multibivrator 75 emits a rectangular pulse 76 whose trailing edge is employed to trigger blocking oscillator 77 into operation. The blocking oscillator, in response to the triggering signal, emits a pulse 78. The pulse 78, because of the sequence of events just described, is generated sometime after the occurrence of pulse 74; the time interval between the generation of pulse 74 and the generation of pulse 78 is long enough to permit the shift registers in channels A, B, and C to settle and gives NOR gates 54 to 64 time to respond to the signals coupled from those registers to the diode matrix.

Output pulse 78 from blocking oscillator 77 is impressed upon gates 79 and 80. Those two gates are arranged so that when one gate is enabled the other gate is inhibited; that is, gates 79 and 80 are arranged so that pulse 78 must pass through one or the other of those gates, but cannot pass through both of them. If a No Valid Reading signal is obtained from NOR gate 65 (FIG. 5) gate 80 is enabled and gate 79 is, simultaneously, inhibited; where no output signal is emitted by NOR gate 65, gate 79 is enabled and gate 80 is inhibited. Where gate 80 is enabled by a No Valid Reading signal, pulse 78 passes through it and causes counter 81 to enter a count of 1. If, upon the generation of the next pulse by blocking oscillator, gate 79 is enabled, the pulse passes through gate 79 and resets counter 81 to zero. Therefore, pulses passing gate 80 cause the counter to count, whereas pulses passing gate 79 reset the counter to zero.

Pulses passing through gate 79 also pass through gate 82 which was enabled along with gate 67 by the enabling signal from flip-flop 83 and actuate counter 84. When the count in counter 84 reaches a predetermined number, indicating that the bar code has been completely read by the scanner, counter 84 emits a signal which inhibits gate 72. Upon being inhibited, gate 72 prevents blocking oscillator 73 from generating more pulses. That action deprives the shift registers 43, 46, and 49, in channels A, B, and C of shift pulses which are normally transmitted along line 68 and prevents the entry in those registers of any new information. Therefore, even though the scanner repeatedly scans the same bar code, the apparatus will not again reread the code. To permit the apparatus to make the next reading, switch 14 must be closed to obtain a signal from source 85 which resets flip-flop 83 and resets counter 84 to zero and then the switch must be opened.

Each time a pulse from blocking oscillator 77 passes through gate 79, it signifies that a valid pattern has been obtained and that the signal emanating from one of the NOR gates 55 to 64 (FIG. 5) is a true conversion of the bar code pattern to its decimal value. The pulses passing through gate 79 can, therefore, be employed to shift the information emitted by NOR gates 55 to 64 into a register or to actuate some other device to utilize the output of those NOR gates. Preferably the information would be entered into some form of temporary storage register to permit the information to be discarded in the event flip-flop 83 was reset before counter 84 emitted a "count complete" signal. A "count complete" signal from counter 84 signifies that the bar code has been completely "read" and that no defective patterns or altered patterns were encountered during the reading. Upon the emission of a "count complete" signal, the information in temporary storage can be accepted as valid. In the event flip-flop 83 is reset before counter 84 emits a "count complete" signal, the bar code has either not been completely read or the code has been rejected as containing defective or altered patterns. In either instance, the information in temporary storage is suspect and should be discarded as not worthy of trust.

In the event that any part of the bar code is tampered with or is subjected to conditions which give erroneous readings to the scanner, the apparatus rejects the entire bar code. Where the pattern read by the scanner does not correspond to one of the patterns in FIG. 1, a No Valid Reading signal is emitted by NOR gate 65 (FIG. 5). With an authentic bar code, normally a valid pattern is immediately followed by an invalid pattern. For example, in FIG. 2 the first two horizontal rows of the bar code constitute a valid start pattern. The 2nd and 3rd horizontal rows of FIG. 2 form the pattern depicted in FIG. 8; that pattern does not correspond to any of the FIG. 1 patterns. Therefore, when the third row is scanned by photocells 10, 11, 12 (FIG. 5) and the information obtained from that row is entered into shift registers 43, 46, 49, NOR gate 65 emits a No Valid Reading signal which causes pulse 78 (FIG. 7) from blocking oscillator 77 to pass through gate 80 and cause counter 81 to enter a count of one. The next horizontal row of the code in FIG. 2 that is scanned is the 4th row. The code reading apparatus recognizes the 3rd and 4th rows as constituting a valid code pattern. NOR gate 65 (FIG. 5) thereupon ceases to emit a signal and the pulse from oscillator 77 (FIG. 7), consequently, passes through gate 79 and resets counter 81 to zero. The 4th and 5th rows in the FIG. 2 bar code form the pattern depicted in FIG. 9; that pattern does not correspond to any of the FIG. 1 patterns. The 5th and 6th rows, however, constitute a valid pattern. It is seen therefore that every valid pattern in the FIG. 2 bar code, with the exception of the last two rows, is followed by an invalid pattern. Where two invalid patterns occur in succession, the bar code is defective or has been altered by tampering. Two successive invalid patterns cause counter 81 to enter a count of two. Upon counting to two, counter 81 emits a signal which resets flip-flop 83 and resets counter 84 to zero. The signal emitted by counter 81 also actuates blocking oscillator 86 and the pulse generated by that oscillator causes counter 81 to be reset to zero. Blocking oscillator 86 is a relatively slow responding device which permits flip-flop 83 to inhibit gate 82 before blocking oscillator 86 generates its pulse. The count of two signal from counter 81 may, if desired, be employed to actuate an alarm device 87 to indicate that a defective bar code has been scanned.

Where the start pattern is followed by the pattern for the decimal 5, as depicted in FIG. 10, there is no transition to mark the change between the start pattern and the 5 pattern and no transition signal is therefore generated. Because of the lack of a transition signal, a start pattern when followed by a 5 pattern cannot give rise to an invalid reading.

Where the pattern for the decimal 5 is immediately followed by another decimal 5 pattern, a false start pattern is formed as shown in FIG. 11. The false start pattern causes NOR gate 54 (FIG. 5) to emit a signal to flip-flop 83 which attempts to "set" that flip-flop. However, flip-flop 83 is already in the "set" state and its condition is not affected by another "set" signal from NOR gate 54. The false start pattern also gives rise to a transition signal which must be recognized as being caused by an invalid pattern if the apparatus is to operate accurately. While NOR gate 54 emits a "start pattern obtained" signal, NOR gate 65 simultaneously emits a "No Valid Reading" signal. The transition pulse from the false start pattern, therefore, results in pulse 78 passing through gate 80 to the count input of counter 81. The false start pattern is thus recognized as spurious. Only after flip-flop 83 is reset will another start pattern be accepted as genuine.

It is evident that the code employed in the invention utilizes an array of elemental areas that are individually coded to have a binary value of ONE or ZERO. The elemental areas may have various shapes, but for purposes of exposition, those areas have been described as being rectangular bars. The binary value of each bar is conveyed in its color which is either black or white, depending upon whether the value of the bar is ONE or ZERO. The binary value of the elemental areas can be conveyed in many other ways. For examples: the elemental area may be either reflective or non-reflective to certain wavelengths of light energy; the elemental area may be either opaque or transparent; the elemental area may be either rough or smooth; the elemental area may be either fluorescent or non-fluorescent; the elemental area may be magnetized or unmagnetized; the elemental area may be electrically charged or electrically neutral; the elemental area may fluoresce in either of two different colors; and the elemental area may be either perforated or unperforated. All that is required for conveying the binary value of an elemental area is that the area be capable of having either one of two distinct characteristics that are readily distinguished by the scanner which reads the code.

An objective of this invention is the employment of a code which is difficult to alter in a manner acceptable to the code reading apparatus. The deliberate alteration of the code can be made difficult, to a great extent, by judicious selection of the coding material and by fixing the ratio of binary ONE's and ZERO's in the code patterns. Accidental damage to a code consisting of black and white elemental areas can result in smudging (i.e. blackening) or scuffing (i.e. whitening) of one or more elemental areas. By employing code patterns having a fixed ratio of black to white areas, a high degree of immunity to erroneous reading of the code patterns is obtained where the pattern has been smudged or scuffed, but not subjected to both forms of damage. The code reading apparatus is arranged to accept as valid patterns only those patterns containing the required binary ONE to binary ZERO ratio. Smudging or scuffing causes an alteration in the required ratio and thereby causes the code reading apparatus to reject the altered pattern as invalid. There is a small probability that both smudging and scuffing can produce compensating effects that would permit the altered pattern to be accepted as valid. That small probability can be further greatly reduced by employing a parity symbol in the coded tag and employing parity checking apparatus in conjunction with the invention.

The table of FIG. 12 shows the maximum number of unique patterns which can be obtained from $m$ number of elemental areas when each pattern contains exactly $n$ number of binary ONE areas. It can be established that every entry in the table having a value greater than unity is the sum of the number immediately to the left and the number immediately above that left number. The table shows the results for patterns having up to 14 elemental areas. For a fixed ratio of binary ONE's to binary ZERO's and an arbitrary number ($m$) of elemental areas, the maximum number of unique patterns is obtained when the ONE to ZERO ratio is unity or as close to unity, for an odd number of elemental areas, as is possible. Thus, for a code consisting of six elemental areas (vis. $m=6$), there are 20 unique patterns exhibiting an equal number (vis. $n=3$) of ONE's and ZERO's. That is, there are twenty different patterns having three binary ONE areas and three binary ZERO areas. In comparison, a ratio of two ONE's to four ZERO's gives 15 unique patterns and a ratio of one ONE to five ZERO's gives only 6 unique patterns.

In the code, the elemental areas are arranged in rows and columns and the scan occurs in the columnar direction. Essentially, the code must have two or more columns and the scanner, preferably, has two or more sensing devices which scan the columns in concert. The columnar arrangement of elemental areas and the columnar scan can be a straight line, as previously described, or they can follow a circular path, a spiral path, or path of other form. In general, one sensing device is employed for each column. However, fewer sensors need be employed where the columns are scanned serially, as in a raster scan, and intermediate storage devices are provided to effect the reconstruction of the parallel scanning obtained by using one sensor for each column. That is, it is obvious to those skilled in the technology of data reading that in lieu of scanning all the columns simultaneously to read the patterns row by row, the columns can be scanned serially in any desired sequence and the information can be stored and later employed to reconstruct the row by row reading.

For flexibility of encoding information, the code must permit any ordering of that information. That is, assuming the information to be the ten decimal symbols 0, 1, 2 . . . 9, the code must permit any ordering of those symbols, including successive ordering of the same symbol. For example, the code must permit a number such as 77711 or 555 to be encoded. To accommodate the consecutive ordering of the same symbol, the code, in order to be self-clocking, must insure that a transition occurs which distinguishes one symbol from its neighbor. That is, there must be a transition in at least one column to indicate that the scan has moved from one symbol pattern to the next symbol pattern, although both symbols are identical. The occurence of a transition can be assured in at least two ways. One way is to provide two different patterns for the same symbol. Thus, for the 0, 1, 2 . . . 9 set of symbols, twenty different code patterns are employed. Twenty different patterns can be obtained by using a code having five elemental areas, each elemental area being in a different column; that is, by using a code having five columns. Where it is desired to adhere to a fixed ONE to ZERO ratio, the encoding for the set of decimal symbols requires the use of a code having six elemental areas in each pattern, each of those areas being in a different one of six columns.

Another way for insuring that a transition occurs, is to employ for each symbol in the set of decimal numerals a code pattern having six elemental areas arranged in two rows and three columns, as depicted in FIG. 1. To insure that there is always a transition in one column, even when adjacent symbols are identical, the code grouping which consists of three elemental areas in any first row (FIG. 1) is never employed (with the exception of the start pattern) in any second row, nor is the code grouping of elemental areas in any second row ever used in any first row. This principle of exclusion can be extended to code patterns which have elemental areas arranged in three rows. The code patterns may even employ four or more rows and a greater number of columns to represent large symbol sets, as for example, the alphabet or the alphabet plus the decimal symbols. The latter having a total of 36 symbols, can be encoded by using code patterns having twelve elemental areas arranged in three rows and four columns. The top row may have four unique patterns, each pattern having a single binary ONE area; the middle row may consist of any one of six patterns, each having two binary ONE areas; and the bottom row may have any one of four patterns, each having three binary ONE areas. The total pattern then consists of 12 elemental areas of which half are binary ONE's and half are binary ZERO's.

In view of the multitude of ways in which the invention can be embodied, it is not intended that the scope of the invention be restricted to the precise arrangements illustrated in the drawings or described in the exposition. Rather it is intended that the scope of the invention be delimited by the claims appended hereto and that within that scope be included only those arrangements which in essence utilize the invention.

What is claimed is:
1. A data reading system comprising:
   means carrying coded information, the code utilizing binary valued elemental areas arranged in rows and columns, each coded unit of information residing in a pattern formed by at least two rows of elemental areas exhibiting a change in binary value between the rows in at least one column, every coded pattern having the same number of elemental areas and the same ratio of binary ONE elemental areas to binary ZERO elemental areas;
   scanning means arranged to scan the columns and read all the elemental areas in a row simultaneously;
   storage means for storing the binary values of the elemental areas in a pattern, the input to the storage means being obtained from the scanning means;
   means for deriving a transition signal from the change in binary value of the elemental areas which occurs in at least one column when the scan of the scanning means passes from one row to another row;
   means responsive to the transition signal for deriving a shift pulse and applying the shift pulse to the storage means to cause information to be shifted therein; and means for recognizing acceptable code patterns, the recognition means providing a signal indicative of the unit of information corresponding to the pattern whose binary values are stored in the storage means.

2. A data reading system according to claim 1, further including:

means for producing a no valid reading signal when binary values of an unacceptable code pattern are entered in the storage means;

a pulse generator responsive to the transition signal for generating a pulse;

a counter for emitting a signal upon attaining a count of two; and gating means for applying the pulse to either the count or reset input of the counter, the gating means responding to a no valid reading signal by causing the pulse to be applied to the count input of the counter.

3. A data reading system according to claim 2, wherein the coded information on the code carrying means is preceded by a start pattern, the system further including:

means for producing a start upon the entry of the start pattern's binary values in the storage means;

a valid pattern counter for counting each acceptable code pattern entered into the storage means; and means responsive to the start signal for enabling the valid pattern counter to commence counting.

4. A data reading system according to claim 3, wherein the valid pattern counter emits a signal upon the attainment of a predetermined count, the system further including:

a gate controlling the application of shift pulses to the storage means, the gate preventing the application of shift pulses to the storage means upon the emission of a signal from the valid pattern counter; and means for causing the valid pattern counter to be reset.

References Cited

UNITED STATES PATENTS

| | | | |
|---|---|---|---|
| 3,104,369 | 9/1963 | Rabinow et al. | 340—146.3 |
| 3,106,706 | 10/1963 | Kolanowski et al. | |
| 3,310,658 | 3/1967 | Ryer | 235—61.11 |

MAYNARD R. WILBUR, *Primary Examiner.*

THOMAS J. SLOYAN, *Assistant Examiner.*

U.S. Cl. X.R.

340—146.3